United States Patent
Lee et al.

(10) Patent No.: US 8,933,185 B2
(45) Date of Patent: Jan. 13, 2015

(54) ACRYLIC RESIN HAVING EXCELLENT TRANSPARENCY, FLUIDITY AND SCRATCH-RESISTANCE

(75) Inventors: Don Keun Lee, Yeosu-si (KR); Yu Ho Kim, Gwangju-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/534,693

(22) Filed: Jun. 27, 2012

(65) Prior Publication Data

US 2012/0271022 A1  Oct. 25, 2012

Related U.S. Application Data

(63) Continuation-in-part of application No. PCT/KR2010/009466, filed on Dec. 29, 2010.

(30) Foreign Application Priority Data

Dec. 29, 2009 (KR) .......... 10-2009-0133441
Dec. 28, 2010 (KR) .......... 10-2010-0137036

(51) Int. Cl.
  *C08F 222/10* (2006.01)
  *C08F 212/10* (2006.01)
  *C08F 20/50* (2006.01)
  *C08L 25/12* (2006.01)
  *C08F 2/38* (2006.01)
  *C08L 33/18* (2006.01)

(52) U.S. Cl.
  CPC ............ *C08F 212/10* (2013.01); *C08F 2/38* (2013.01); *C08L 25/12* (2013.01); *C08L 33/18* (2013.01)
  USPC ........ 526/329.2; 526/319; 526/299; 526/326; 526/328.5; 525/106; 525/122; 525/227; 525/246

(58) Field of Classification Search
  CPC ...... C08F 220/18; C08F 212/08; C08F 20/50; C08F 18/04; C08F 8/42; C08F 8/00; C08F 222/10; C08F 212/10; C08L 63/00; C08L 23/0869; C08L 25/12
  USPC .............. 526/329.2, 319, 299, 326, 328.5; 525/106, 122, 227, 246
  See application file for complete search history.

(56) References Cited

FOREIGN PATENT DOCUMENTS

| KR | 10-2005-0026176 A | * | 3/2005 |
|----|----|----|----|
| KR | 10-2007-0064925 A | | 6/2007 |
| KR | 10-2008-0112035 A | | 12/2008 |
| WO | 2011/081426 A2 | | 7/2011 |

OTHER PUBLICATIONS

International Search Report in counterpart International Application No. PCT/KR2010/009466 dated Sep. 27, 2011, pp. 1-4.

* cited by examiner

*Primary Examiner* — Michael M Bernshteyn
(74) *Attorney, Agent, or Firm* — Additon, Higgins & Pendleton, P.A.

(57) ABSTRACT

An acrylic resin that can have excellent transparency, flowability and scratch-resistance property is prepared by polymerizing a monomer mixture comprising about 10 to about 25% by weight of (meth)acrylic acid alkyl ester monomer, about 50 to about 80% by weight of aromatic vinyl compound, and about 10 to about 25% by weight of vinyl cyanide compound.

14 Claims, No Drawings

ACRYLIC RESIN HAVING EXCELLENT TRANSPARENCY, FLUIDITY AND SCRATCH-RESISTANCE

CROSS-REFERENCE TO RELATED APPLICATIONS

This application is a continuation-in-part of International Application No. PCT/KR2010/009466, filed Dec. 29, 2010, pending, which designates the U.S., published as WO 2011/081426, and is incorporated herein by reference in its entirety, and claims priority therefrom under 35 USC Section 120. This application also claims priority under 35 USC Section 119 from Korean Patent Application No. 10-2009-0133441, filed Dec. 29, 2009, and Korean Patent Application No. 10-2010-0137036, filed Dec. 28, 2010, in the Korean Intellectual Property Office, the entire disclosure of each of which is also incorporated herein by reference.

FIELD OF THE INVENTION

The present invention relates to an acrylic resin that can have excellent transparency, flowability and scratch-resistance.

BACKGROUND OF THE INVENTION

Conventionally, (meth)acrylic acid alkyl ester-styrene-acrylonitrile copolymer resin polymerized using (meth)acrylic acid alkyl ester monomer, acrylonitrile monomer and styrene monomer can have an excellent balance of appearance and physical properties. This can be attributed to the excellent stiffness and transmittance of (meth)acrylic acid alkyl ester and excellent processability and chemical resistance of acrylonitrile. However, (meth)acrylic acid alkyl ester-styrene-acrylonitrile copolymer resins typically have a high amount of (meth)acrylic alkyl ester and thus can have poor flowability and can be difficult to compound with transparent acrylonitrile-butadiene-styrene (ABS) resins.

(Meth)acrylic acid alkyl ester-styrene-acrylonitrile copolymer resins can be prepared by emulsion, suspension, or bulk polymerization. In emulsion polymerization, the surfaces which can polymerize are widely distributed because the sizes are smaller than surfaces in other polymerization processes and regions can occur in the polymerization with a micelle structure of hundreds to thousands Å. It can also be easy to control temperatures, and polymerization can be stable and can be conducted over a short time. However, emulsion polymerization can result in coloring problems due to the presence of residual polymerization additives and steam discoloration problems. There can also be production efficiency and facilities problems associated with emulsion polymerization because polymer slurries prepared by solidifying the polymer have to be cleaned, dehydrated, and dried. There can also be waste water treatment problems, and the resultant products can exhibit reduced transparency due to extrusion and injection impurities and extruded sheets can have a poor appearance.

SUMMARY OF THE INVENTION

The present invention relates to an acrylic resin that can have good transparency, flowability and scratch-resistance. The acrylic resin is prepared by polymerizing a monomer mixture comprising about 10 to about 25% by weight of (meth)acrylic acid alkyl ester monomer, about 50 to about 80% by weight of aromatic vinyl compound, and about 10 to about 25% by weight of vinyl cyanide compound. In exemplary embodiments of the present invention, the (meth)acrylic acid alkyl ester monomer may be included in an amount of about 18 to about 25% by weight.

The acrylic resin can have a weight average molecular weight of about 100,000 to about 200,000.

The acrylic resin may be prepared by suspension polymerization of the monomer mixture.

The acrylic resin can have a melt index (MI) measured in accordance with ASTM D1238 of about 15 to about 100 g/10 min. The acrylic resin may also have a scratch-resistance measured in accordance with JIS K5401 of about F to about H pencil hardness. In exemplary embodiments, the acrylic resin may have a scratch-resistance measured in accordance with JIS K5401 of more than about H pencil hardness.

The present invention also provides a method for preparing an acrylic resin. In exemplary embodiments, the method comprises: preparing a monomer mixture comprising about 10 to about 25% by weight of (meth)acrylic acid alkyl ester monomer, about 50 to about 80% by weight of aromatic vinyl compound, and about 10 to about 25% by weight of vinyl cyanide compound, deionized water, a dispersion agent (also referred to herein as a dispersant), and an initiator; polymerizing the mixture about 60 to about 85% of degree of polymerization; and terminating the polymerization of the polymer, for example by autothermally increasing the temperature through exothermic reaction (that is, by self heating without a heating element).

The present invention also provides a thermoplastic resin composition comprising the acrylic rein.

Hereinafter, details of the present invention will be described in more detail.

DETAILED DESCRIPTION OF THE INVENTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides an acrylic resin by polymerizing a monomer mixture comprising about 10 to about 25% by weight of (meth)acrylic acid alkyl ester monomer, about 50 to about 80% by weight of aromatic vinyl compound, and about 10 to about 25% by weight of vinyl cyanide compound. As used herein, the term "alkyl" of the (meth)acrylic acid alkyl ester monomer can include C1-C20 alkyl, for example C1-C10, alkyl.

The monomer mixture can include the (meth)acrylic acid alkyl ester monomer in an amount of about 10 to about 25% by weight, for example about 18 to about 25% by weight, based on the total weight of the monomer mixture. In some embodiments, the monomer mixture includes the (meth)acrylic acid alkyl ester monomer in an amount of about 10, 11, 12, 13, 14, 15, 16, 17, 18, 19, 20, 21, 22, 23, 24, or 25% by weight. Further, according to some embodiments of the present invention, the amount of (meth)acrylic acid alkyl ester monomer can be in a range from about any of the foregoing amounts to about any other of the foregoing amounts.

If the amount of the (meth)acrylic acid alkyl ester monomer is more than about 25% by weight, flowability of the polymerized resin may be deteriorated. If the amount of the (meth)acrylic acid alkyl ester monomer is less than about 10% by weight, scratch-resistance may be deteriorated. To impart excellent flowability and scratch-resistance at the same time, the amount of the (meth)acrylic acid alkyl ester monomer can be about 18 to about 25% by weight.

Examples of (meth)acrylic acid alkyl ester monomer used in the present invention may include without limitation (meth)acrylic acid methyl ester, (meth)acrylic acid ethyl ester, (meth)acrylic acid propyl ester, (meth)acrylic acid 2-ethylhexyl ester, (meth) acrylic acid decyl ester, and the like, and combinations thereof In exemplary embodiments, methyl methacrylate can be used.

The monomer mixture can include the aromatic vinyl compound in an amount of about 50 to about 80% by weight, based on the total weight of the monomer mixture. In some embodiments, the monomer mixture includes the aromatic vinyl compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of aromatic vinyl compound can be in a range from about any of the foregoing amounts to about any other of the foregoing amounts.

Examples of aromatic vinyl compound used in the present invention may include without limitation styrene, α-methylstyrene, vinyl toluene, and the like, and combinations thereof. In exemplary embodiments, styrene can be used.

The monomer mixture can include the vinyl cyanide compound in an amount of about 10 to about 25% by weight, based on the total weight of the monomer mixture. In some embodiments, the monomer mixture includes the vinyl cyanide compound in an amount of about 10, 11, 12, 13, 14, 15, 16, 17, 18, 19, 20, 21, 22, 23, 24, or 25% by weight. Further, according to some embodiments of the present invention, the amount of vinyl cyanide compound can be in a range from about any of the foregoing amounts to about any other of the foregoing amounts.

If the amount of the vinyl cyanide compound is less than about 10% by weight, scratch-resistance of the resin may be deteriorated.

Examples of the vinyl cyanide compound include without limitation acrylonitrile, methacrylonitrile, and the like, and combinations thereof. In exemplary embodiments acrylonitrile can be used.

Conventional (meth)acrylic acid alkyl ester-styrene-acrylonitrile copolymer resins can have poor flowability, because the amount of the (meth)acrylic acid alky ester is high, but if the amount of the (meth)acrylic acid alky ester is reduced, scratch-resistance, and the like can deteriorate. The inventors have found, however, that reducing the amount of the (meth)acrylic acid alkyl ester can improve flowability of a (meth)acrylic acid alkyl ester-styrene-acrylonitrile copolymer resin and that increasing the amount of the acrylonitrile can supplement reduced scratch-resistance resulting from the reduced amount of the (meth)acrylic acid alkyl ester.

The weight average molecular weight of the acrylic resin for the present invention can be about 100,000 to about 200,000, for example about 120,000 to about 160,000. If the weight average molecular weight of the acrylic resin is less than about 100,000, flowability may be good but impact strength can be deteriorated. If the weight average molecular weight of the acrylic resin is more than about 160,000, flowability and transparency can be deteriorated.

The weight average molecular weight of the acrylic resin can be controlled by a chain transfer agent. The chain transfer agent used in the present invention can be an alkyl mercaptan. Examples of alkyl mercaptans include without limitation n-butyl mercaptan, n-octyl mercaptan, t-octyl mercaptan, n-dodecyl mercaptan, t-dodecyl mercaptan, and the like, and combinations thereof, for example n-octyl mercaptan mixed with t-dodecyl mercaptan.

In exemplary embodiments of the present invention, the acrylic resin may be prepared by suspension polymerization. Inorganic or organic dispersants can be used as a suspension agent or suspension stabilizer. When preparing a transparent acrylic resin by suspension polymerization, if an inorganic dispersant is used as a suspension agent or suspension stabilizer, the stabilizer dispersion effect can be improved. However, after polymerization, the inorganic dispersant has to be removed by a strong acid such as hydrochloric acid, and the like to improve transparency. Residual strong acid, however, can corrode equipment.

Therefore, in exemplary embodiments, an organic dispersant can be used. However, an organic dispersant can deteriorate transparency and appearance of a transparent acrylic resin because the organic dispersant can generate a significant amount of scaling which can affect transparency and appearance of a transparent acrylic resin on the wall of the polymerization reactor. Thus when an organic dispersant is used, it can be useful to also use another type of dispersant. As will be appreciated by the skilled artisan, the other types of dispersants include dispersant aids which aid a dispersant to improve separation of particles and prevent settling or clumping.

Examples of organic dispersants useful as suspension agents (also suspension stabilizers) include without limitation acrylic acid, methacrylic acid, copolymers thereof, and the like, and combinations thereof. When a copolymer is used, the amount of the acrylic acid or methacrylic acid can be more than about 50 parts by weight, based on the total weight of the copolymer. Also, sodium, potassium or ammonium salts thereof can be used. The salts can maintain solubility in water as a dispersion medium and suspended monomer. The salts can be characterized by the components and molecular weight of the suspension agent. Organic dispersants are known in the art and are commercially available.

Examples of the other types of dispersants include without limitation monobasic sodium phosphate, dibasic sodium phosphate, tribasic sodium phosphate, sodium pyrophosphate, sodium hexametaphosphate, sodium tripolyphosphate, potassium pyrophosphate, dibasic potassium phosphate, tribasic potassium phosphate, calcium nitrate, caustic soda, sodium sulfite, and the like, and combinations thereof. These compounds are also known in the art and are commercially available.

The acrylic resin of the present invention can exhibit improved transparency, scratch-resistance and flowability at the same time. In exemplary embodiments, the acrylic resin can have a melt index (MI) measured in accordance with ASTM D1238 of about 15 to about 100 g/10 min and a scratch-resistance measured in accordance with JIS K5401 of about F to about H pencil hardness. Also, the acrylic resin can have a scratch-resistance measured in accordance with JIS K5401 of more than about H pencil hardness. In addition, total light transmittance of the acrylic resin can be more than about 90%.

The present invention also provides a method for preparing an acrylic resin comprising: mixing a monomer mixture comprising about 10 to about 25% by weight of (meth)acrylic acid alkyl ester monomer, about 50 to about 80% by weight of aromatic vinyl compound, and about 10 to about 25% by weight of vinyl cyanide compound, deionized water, a dispersant, and an initiator; polymerizing the mixture about 60 to about 85% of degree of polymerization; and terminating polymerization of the polymer by increasing the temperature, for example by autothermally increasing the temperature through exothermic reaction. The terms "autothermal," "autothermally," "exothermal reaction," and "exothermic reaction" are terms of art well understood by the skilled artisan and refer generally to self heating without a heating element.

The term "% of degree of polymerization" is also a term of art well understood by the skilled artisan and refers generally to the % of the number of monomeric units in a macromolecule or polymer or oligomer.

In exemplary embodiments of the present invention, the mixture can include about 100 to 150 parts by weight of deionized water, about 0.01 to about 1 part by weight of dispersant and about 0.1 to about 1 part by weight of initiator, each based on about 100 parts by weight of the monomer mixture.

Initiators useful in the polymerization reaction are known in the art and are commercially available.

The present invention also provides a thermoplastic resin comprising the acrylic resin. Because the acrylic resin of the present invention can have excellent transparency, scratch-resistance and flowability at the same time, when the acrylic resin is compounded with another resin material, a resin which has low flowability can be used.

The invention may be better understood by reference to the following examples which are intended for the purpose of illustration and are not to be construed as in any way limiting the scope of the present invention, which is defined in the claims appended hereto.

EXAMPLES

Example 1

A mixture comprising 20% by weight of methyl methacrylate (MMA) monomer, 20.3% by weight of acrylonitrile monomer, and 59.7% by weight of styrene, and 0.16 parts by weight of t-dodecyl mercaptan, 0.21 parts by weight of n-octyl mercaptan, 0.14 parts by weight of 2,2'-azobisisobutironitrile as an initiator, 1.0 parts by weight of dibasic phosphate soda (anhydrous), 0.025 parts by weight of acrylic polymer and 130 parts by weight of deionized water based on 100 parts by weight of the mixture are added into a sealed reactor and stirred at about 75° C. for about 200 min to start polymerization. The reaction is terminated by exothermal reaction without controlling the temperature of the reactor. The resultant copolymer is cleaned and dried to obtain a white powder.

Example 2

Example 2 is prepared in the same manner as Example 1 except that a mixture including 25% by weight of methyl methacrylate (MMA) monomer, 18% by weight of acrylonitrile monomer and 57% by weight of styrene is used.

Comparative Examples 1 to 3

Polymethylmethacrylate (PMMA) resin, methyl methacrylate-styrene-acrylonitrile (MSAN) resin including more than 50% by weight of MMA, and SAN resin (all commercially available from Cheil Industries, Inc.) that are widely known to a person having ordinary skill in the art to which the invention pertains are used and the amounts of the components are shown in Table 1.

The components of the examples and the comparative examples are processed under identical conditions. The mixture is extruded through a conventional twin screw extruder in the form of pellets and the specimen is prepared by injection molding the pellets.

Methods for Measuring Properties

The properties of the samples of the Examples and Comparative Examples are measured and evaluated according to the methods described below:

(1) Weight average molecular weight and molecular weight distribution: measured by gel chromatography.

(2) Melt index (g/10 min): measured according to ASTM D1238 (220 ° C., 10 Kg).

(3) Pencil hardness: measured for a 10 mm×10 mm×3 mm specimen at 23° C. and 500 g according to JIS K5401 five times. When more than two of pencil marks are generated, the level of the pencil hardness is measured on a scale from 4B to 4H.

(4) Transparency: measured as total light transmittance and haze using a color computer manufactured by SUGA INSTRUMENT, INC. of Japan.

Total light transmittance (%)=specimen transmitted light/specimen illuminated light×100

Haze (%)=dispersed transmitted light/total light transmittance×100

TABLE 1

|  |  |  | Examples | | Comparative Examples | | |
|---|---|---|---|---|---|---|---|
|  |  |  | 1 | 2 | 1 | 2 | 3 |
| Component | Methyl methacrylate | | 20 | 25 | 100 | 73.4 | — |
|  | Styrene | | 59.7 | 57 | — | 21.5 | 75 |
|  | Acrylonitrile | | 20.3 | 18 | — | 5.1 | 25 |
|  | t-dodecyl mercaptan | | 0.16 | 0.16 | — | 0.25 | 0.25 |
|  | n-octyl mercaptan | | 0.21 | 0.21 | 0.3 | 0.15 | — |
| Properties | Molecular weight | Mw (k) | 159 | 152 | 100 | 120 | 150 |
|  |  | Mn (k) | 64 | 63 | 51 | 47 | 67 |
|  | Melt index (MI) 10 Kg/220° C. | | 51 | 45 | 4 | 10 | 68 |
|  | Scratch-resistance (Pencil hardness) | | H | H | 3H | H | HB~F |
|  | Transparency | Transmittance | 91.6 | 91.7 | 94.5 | 92.4 | 90.2 |
|  |  | Haze | 0.6 | 0.7 | 0.2 | 0.5 | 1.2 |

As shown in Examples 1-2, an acrylic resin of the present invention has excellent transparency, scratch-resistance and flowability. Specially, as compared to Comparative Example 2 using general MSAN comprising more than 50% by weight of MMA, the acrylic resin of the present invention has excellent flowability.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An acrylic resin prepared by polymerizing a monomer mixture consisting of about 10 to about 25% by weight of (meth)acrylic acid alkyl ester monomer, about 50 to about 80% by weight of aromatic vinyl compound, and about 10 to about 25% by weight of vinyl cyanide compound.

2. The acrylic resin of claim 1, wherein the monomer mixture includes about 18 to about 25% by weight of the (meth)acrylic acid alkyl ester monomer.

3. The acrylic resin of claim 1, wherein the acrylic resin has a weight average molecular weight of about 100,000 to about 200,000.

4. The acrylic resin of claim 1, wherein the acrylic resin is prepared by suspension polymerization of the monomer mixture.

5. The acrylic resin of claim 1, wherein the acrylic resin has a melt index (MI) measured in accordance with ASTM D1238 of about 15 to about 100 g/10min.

6. The acrylic resin of claim 1, wherein the acrylic resin has a scratch-resistance measured in accordance with JIS K5401 of more than about H pencil hardness.

7. The acrylic resin of claim 1, wherein the acrylic resin has a scratch-resistance measured in accordance with JIS K5401 of about F to about H pencil hardness.

8. A method for preparing an acrylic resin comprising:
   polymerizing a monomer mixture consisting of about 10 to about 25% by weight of (meth)acrylic acid alkyl ester monomer, about 50 to about 80% by weight of aromatic vinyl compound, and about 10 to about 25% by weight of vinyl cyanide compound to form an acrylic polymer.

9. The method of claim 8, wherein the polymerizing step further includes polymerizing the monomer mixture in the presence of deionized water, a dispersant, and an initiator.

10. The method of claim 8, wherein the polymerizing step comprises polymerizing the mixture about 60 to about 85% of degree of polymerization.

11. The method of claim 8, further comprising terminating polymerization by increasing temperature.

12. The method of claim 11, wherein the polymerization is terminated by autothermally increasing temperature through exothermal reaction.

13. The method of claim 9, wherein the polymerizing step includes polymerizing the monomer mixture in the presence of about 100 to 150 parts by weight deionized water, about 0.01 to about 1 parts by weight dispersant and about 0.1 to about 1 parts by weight of initiator, each based on about 100 parts by weight of the monomer mixture.

14. A thermoplastic resin composition comprising the acrylic resin according to claim 1.

* * * * *